Oct. 13, 1953  R. BONINSEGNI  2,654,996
GAS TURBINE COMBUSTION CHAMBER
Filed Sept. 6, 1949  2 Sheets-Sheet 1

INVENTOR.
Renato Boninsegni
BY
Benjamin Toman,
ATTORNEY.

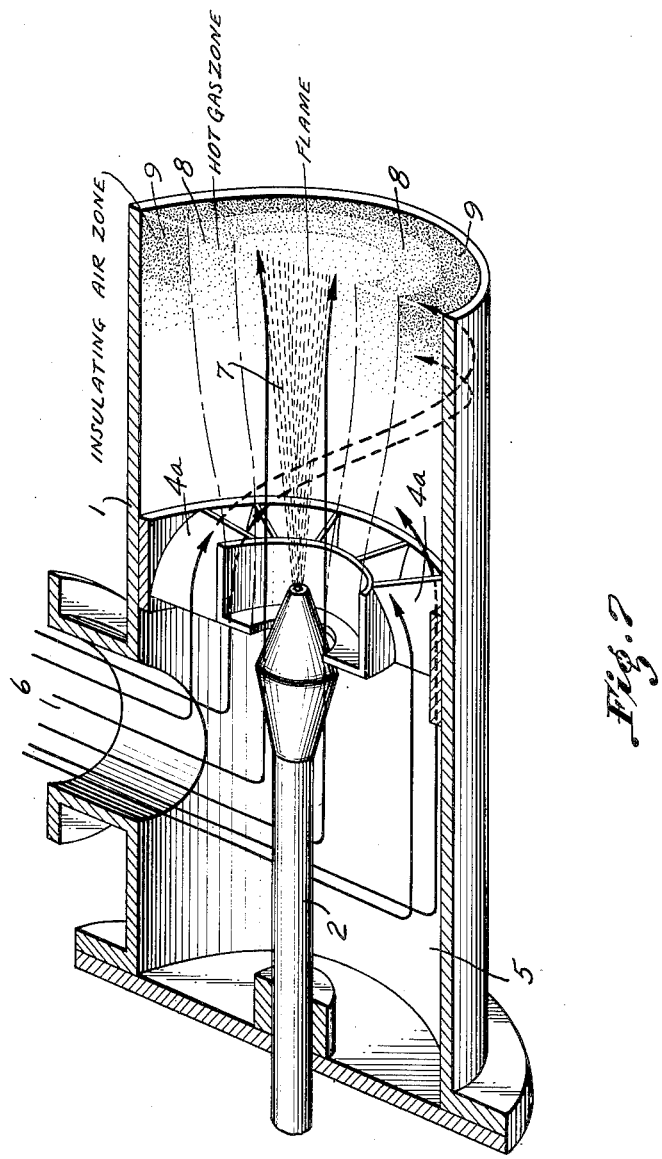

Patented Oct. 13, 1953

2,654,996

UNITED STATES PATENT OFFICE 2,654,996

GAS TURBINE COMBUSTION CHAMBER

Renato Boninsegni, Zurich, Switzerland, assignor to Ateliers de Construction Oerlikon, Zurich-Oerlikon, Switzerland, a corporation of Switzerland Application September 6, 1949, Serial No. 114,122
In Switzerland October 26, 1948

1 Claim. (Cl. 60—39.65)

The combustion chambers of gas turbines must withstand heavy thermal loads due to the very great heat radiation of the incandescent fuel. In order to protect efficiently the internal walls of the chambers, designers have adopted various more or less complicated systems, the most usual of which are, for example, the use of double walls between which circulates a liquid or gaseous cooling fluid, a construction of the internal wall of refractory materials of the ceramic or porcelain types, the use of special steels resisting high temperatures or the use of transpiring materials constituted by agglomerates of metallic powders or of ceramic materials the porosity of which permits the passage of liquids under pressure.

In a general way, at the present time the temperature of admission of the gases into the gas turbine does not exceed 600 to 650° C. for continuous duty. The gases produced in the furnace pass out at a temperature of from 1200 to 1300° C. and must consequently be cooled before being used in the turbine. This cooling is achieved by mixing hot gases with colder air, in a mixing zone which itself also requires special construction.

The present invention relates to a combustion chamber of the type having a wall in the form of a cylinder, in the axis of which is mounted a fuel injector and has for its object the abolition of refractory materials or of metals resisting very high temperatures; simplification of the construction by the absence of the mixing zone; dependable operation not requiring frequent and troublesome overhaul.

To this end, the combustion chamber of the invention is characterized by the fact that the mixing air enters said chamber after passing through at least one distributor which gives it a gyratory movement to cause the jets of air to move in a helical path, so that by the effect of centrifugal force, the air will tend to bear against the wall of the chamber, thus forming a protective mantle or layer of air against the heat of radiation of the flame and the convection of the hot combustion gases.

In the accompanying drawings, which illustrate the invention somewhat schematically and by way of example:

Figure 7 is a perspective longitudinal cross-sectional view of the invention, illustrated diagrammatically in Fig. 1.

Figure 1:
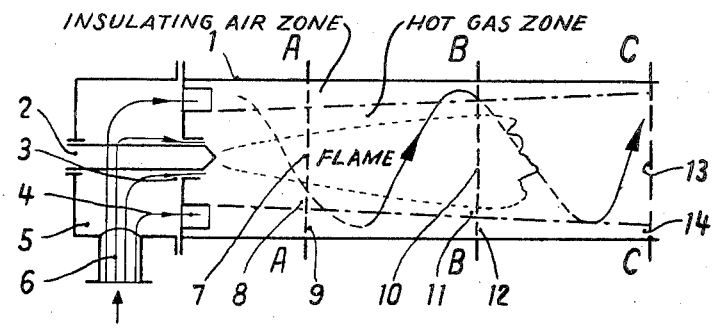
Fig. 1 is a longitudinal section of one embodiment of the invention.

1 is the internal pressure resisting wall of the combustion chamber shown here in cylindrical form. On the longitudinal axis of the latter is mounted the fuel injector 2 which may be of any type, the space between said axis and said wall being open and uninterposed. Concentrically with the latter is located at 3 the primary air inlet, admitting the air forcibly and lineally forwardly into the chamber, whilst 4 is a distributor of mixing air 9 provided with blading 4a, Fig. 7, through which enters the secondary or mixing air. 5 is a common distribution chamber of the air under pressure, for both the primary and secondary air 9, provided with the inlet 6.

The mixing air 9, given a strong gyratory movement by the blading 4a of the distributor 4, follows a helicoidal path and due to the centrifugal force will remain in contact with the wall 1, thus forming a protecting mantle or layer insulating the wall against the heat of radiation and the convection of the hot gases.

Figures 2, 3, 4:
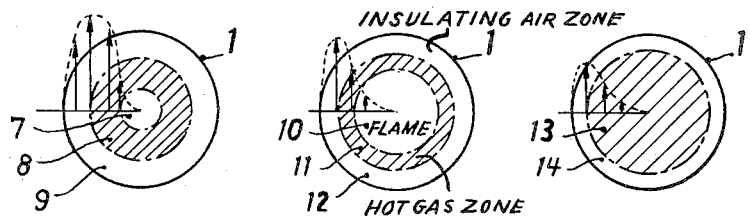
Figs. 2, 3, 4 are transverse sections on the lines A—A, B—B, and C—C respectively.

In Figs. 2 to 4 are illustrated three main zones in the chamber. At the central zone 7 is located the flame, at 8 a zone of hot gases produced by combustion and adjacent the wall the zone 9 of the insulating air. The combustion gases tend to expand and will be expelled from the chamber, bearing against the zone 9 of insulating air. Since the combustion gases will be entrained by the insulating air, they too will follow a helicoidal path. Nevertheless, as their specific mass is less than that of the air, they will scarcely be subjected to the effect of centrifugal force.

The gases produced by combustion will thus be expelled in the central zone without coming into contact directly with the wall 1.

Nevertheless, as it moves along the combustion chamber, the mixing air gradually loses its initial kinetic energy. The thickness of the zone of insulating air will therefore diminish, the intermediate zone of burned gases will tend to diverge and the flame itself will diverge.

Figure 5:
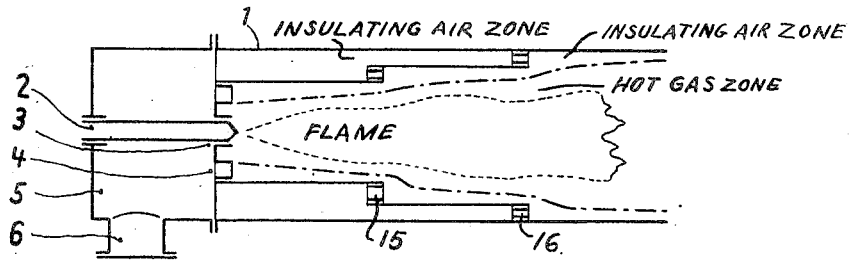
Fig. 5 is a longitudinal section of a further embodiment.
Figure 6:
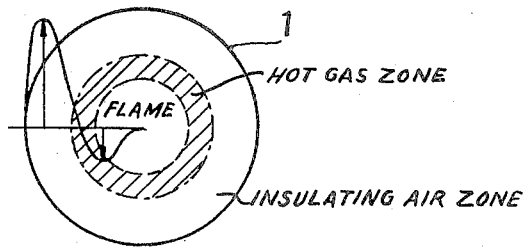
Fig. 6 is a transverse section corresponding with that of Fig. 3.

If, for reasons of construction or to ensure full combustion (of solid, liquid, or gaseous fuels), it is necessary to make the chamber very long, it will be possible while still observing the principle of the present invention, to provide a combustion chamber equipped with a plurality of distributors, spaced, for example, as illustrated diagrammatically in Fig. 5. As before, the primary or mixing air may be given a rotational or helicoidal movement. Fig. 6 illustrates the relationship of air and gas speeds in the case where the directions of rotation are opposite, which may occur, for example, if the fuel injector is a rotary atomiser the direction of rotation of which is opposite to that of the mixing air. This disposition gives at a certain point a relative speed of rotation of zero. It is at that point that the line of separation occurs between the flame and the gases produced by combustion.

Along the wall may be provided at least one additional or secondary mixing air distributor, such as 15 and 16, giving that air a movement of rotation in the same direction as that of the main mixing air.

The mixing airs (primary and secondary) may be supplied from the same source or from different sources and, if desired, at different temperatures and pressures.

Having now particularly described and ascertained the nature of my said invention and in what manner the same is to be performed, I claim:

A gas turbine combustion chamber comprising a cylindrical pressure-resisting wall, a fuel injector mounted at the longitudinal axis of said wall creating a fuel combustion flame which is coaxial with the axis of said wall, inletting means surrounding said injector forcing a stream of primary air lineally forwardly for creating a cylindrical hot gas zone enveloping said flame, the space between said zone and pressure-resisting wall being uninterposed, and inletting means surrounding said other means having blading therein which is configuratingly adapted to force secondary mixing air into the chamber of said wall in form of a helicoidal path and gyrating cylinder that bears centrifugally forcibly against said pressure-resisting wall as a layer which envelops said zone and protects said pressure-resisting wall against superheating by the radiation of said zone.

RENATO BONINSEGNI.

References Cited in the file of this patent

UNITED STATES PATENTS

| Number | Name | Date |
|---|---|---|
| Re. 23,149 | Lubbock et al. | Sept. 20, 1949 |
| 1,102,510 | Irish | July 7, 1914 |
| 1,136,849 | Tucker | Apr. 20, 1915 |
| 1,431,763 | Service | Oct. 10, 1922 |
| 1,665,800 | Strachan | Apr. 10, 1928 |
| 1,910,735 | Zikesch | May 23, 1933 |
| 2,271,587 | Haynes | Feb. 3, 1942 |
| 2,404,335 | Whittle | July 16, 1946 |
| 2,446,059 | Peterson et al. | July 27, 1948 |
| 2,458,992 | Hague | Jan. 11, 1949 |
| 2,470,184 | Pfenninger | May 17, 1949 |
| 2,480,547 | Caracristi | Aug. 30, 1949 |
| 2,500,787 | Lelgemann | Mar. 14, 1950 |
| 2,517,015 | Mock | Aug. 1, 1950 |
| 2,553,091 | Horning | May 15, 1951 |
| 2,560,223 | Hanzalek | July 10, 1951 |

FOREIGN PATENTS

| Number | Country | Date |
|---|---|---|
| 376,570 | Germany | May 30, 1923 |
| 484,289 | Great Britain | May 3, 1938 |
| 539,069 | Great Britain | Aug. 27, 1941 |
| 588,086 | Great Britain | May 14, 1947 |